United States Patent [19]

Rees

[11] Patent Number: 4,922,996
[45] Date of Patent: May 8, 1990

[54] METHOD AND APPARATUS FOR HEAT RECOVERY FROM HYDRAULIC OIL

[76] Inventor: Cyril A. Rees, 23, The Boltons, Portarlington Close, Portarlington Road, Westbourne, Bournemouth, Dorset BH14 2DR, England

[21] Appl. No.: 164,931

[22] Filed: Mar. 8, 1988

[51] Int. Cl.$^5$ .................. F28F 27/00; B29C 45/73; G05D 23/00
[52] U.S. Cl. ............................ 165/1; 165/39; 165/47; 236/78 B; 236/91 F; 62/DIG. 10; 62/201; 264/40.6; 425/144
[58] Field of Search .................. 165/47, 27, 48.1, 40, 165/39, 1; 236/78 B, 91 F, ; 184/104.1, 6.22; 62/201, 209, DIG. 10; 60/912; 264/40.1, 40.6; 425/143, 144

[56] References Cited

U.S. PATENT DOCUMENTS

| | | | |
|---|---|---|---|
| 3,213,934 | 10/1965 | Jentet | 165/39 |
| 3,480,076 | 11/1969 | Tomita | 165/48.1 |
| 3,820,590 | 6/1974 | Littman et al. | 165/39 |
| 4,363,356 | 12/1982 | Johansing, Jr. | 165/11.1 |

FOREIGN PATENT DOCUMENTS

| | | | |
|---|---|---|---|
| 0048234 | 3/1982 | European Pat. Off. | 165/39 |
| 0218919 | 4/1987 | European Pat. Off. | 425/144 |
| 2305502 | 8/1974 | Fed. Rep. of Germany | 236/91 F |
| 3020191 | 12/1981 | Fed. Rep. of Germany | 165/40 |
| 0647860 | 2/1985 | Switzerland | 165/47 |

OTHER PUBLICATIONS

Miller, John E. "Four Ways to Cool Hydraulic Oil" Hydraulics & Pneumatics Jun. 1971, pp. 69–70.

Primary Examiner—John Ford
Attorney, Agent, or Firm—Foley & Lardner, Schwartz, Jeffery, Schwaab, Mack, Blumenthal & Evans

[57] ABSTRACT

To reduce the heat present in hot hydraulic oil, the oil is passed through a heat exchanger in heat exchange relation with water. The temperature of the water entering the exchanger is at least 28° C. and the quantity of water circulated through the exchanger is such that the difference between the ingoing and outgoing temperatures of the oil at the heat exchanger is not more than 10° C.

6 Claims, 2 Drawing Sheets

METHOD AND APPARATUS FOR HEAT RECOVERY FROM HYDRAULIC OIL

BACKGROUND OF THE INVENTION

There are many machines which are operated by means of hydraulic oil in hydraulic circuitry. During the operating of the machine the temperature of the hydraulic oil can exceed 40° C. The present invention relates to a method of, and apparatus for, reducing heat present in the hydraulic oil.

A known arrangement for removing heat from hydraulic oil is to bring the oil and water in heat exchange relationship in a heat exchanger using low water inlet and outlet temperature to compensate for the poor overall heat transfer efficiency. Heat from the cooling water is dissipated to atmosphere by way of a spray cooling tower or the like.

There are various disadvantages with this known arrangement, one of which is that, if the temperature of the oil is reduced too severely, its viscosity is increased and provision for pumping the oil has to be increased.

SUMMARY OF THE INVENTION

According to the present invention, in a method of reducing heat present in hydraulic oil in hydraulic circuitry of a machine, oil at a temperature of at least 40° C. is circulated from the machine through a heat exchanger in heat exchange relation with water circulated therethrough, the temperature of the water entering the exchanger is at least 28° C. and the quantity of water is controlled such that the difference in temperature of the oil entering and leaving the heat exchanger is not more than 10° C.

By ensuring that the water in the heat exchanger has a temperature of not less than 28° C., the oil viscosity is reduced to a level at which sufficient oil can be pumped through the heat exchanger to achieve the necessary transfer of heat at a pressure which does not cause failure of the heat exchanger and, by reducing the viscosity, the heat transfer rate between the oil and water is raised.

These two effects are synergistic and result in a rapid increase in heat transfer efficiency and reduction in pressure drop as the cooling water temperature is raised.

The temperature of the cooling water entering the heat exchanger can be raised to 40° C. or more and the temperature of the water leaving the heat exchanger can be 58° C. or more.

This outgoing water temperature is sufficiently high for heat to be dissipated by simple air cooling. The water may be passed through an air cooled coil, the air cooling being controlled such that the temperature of the water leaving the coil is not less than 28° C. Warm air from the air cooled coil will be at a temperature sufficiently high for it to be used for space and some process heating. Should additional heat be required, a portion of the water from the coil can be used to cool the compressed refrigerant vapour of cooling means operating on the refrigeration cycle before being returned to the coil.

The invention is particularly applicable to reducing heat in the hydraulic oil of a plastics injection or blow moulding machine and, in this application where higher moulding temperatures are required, the additional high grade heat required can be provided from the cooling oil of the air compressor(s) used for robotics and other purposes and/or from other sources of heat, such as electric immersion heaters or industrial-type boilers. When chilled water is required, (usually when the outside air temperature is above 8° C.), this can be provided by a chilling unit of reduced capacity.

Heat from the higher temperature circuits can be used to pre-heat the moulds when starting up and to maintain the moulds at operating temperature during temporary shut-downs.

When using indirect water to cool the moulds, a very low approach temperature between the primary and secondary cooling water circuits can be achieved by using a plate or similar high efficiency heat exchanger to transfer heat between the two circuits. If water temperatures above 95° C. are required, the mould heating circuit can be pressurised.

BRIEF DESCRIPTION OF THE DRAWING

In order that the invention may be more readily understood, it will now be described, by way of example only, with reference to the accompanying drawing, in which.

DETAILED DESCRIPTION OF PREFERRED EMBODIMENTS

Figure 1:
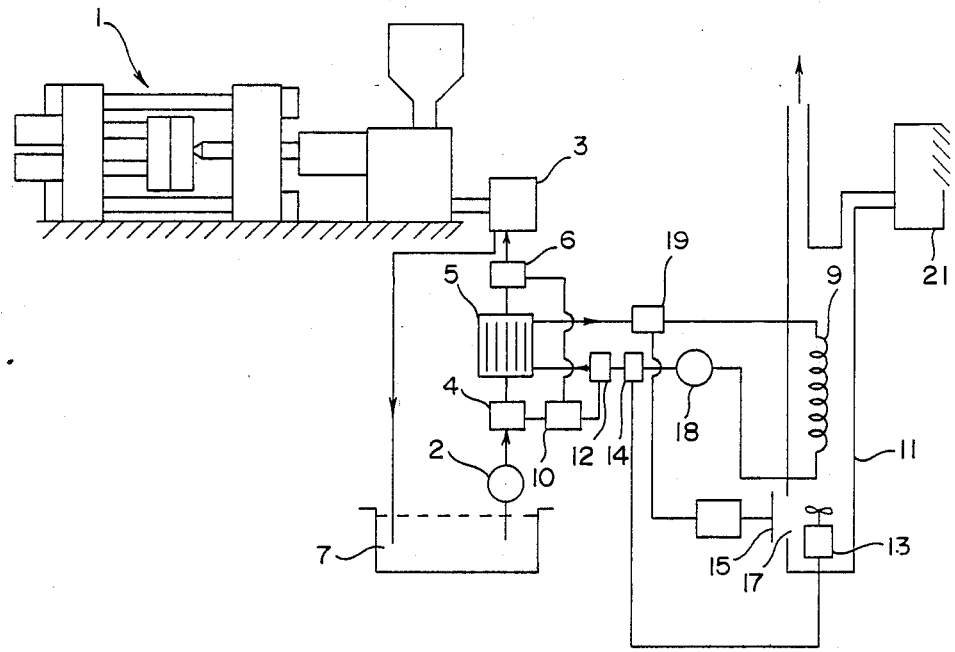
FIG. 1 shows diagrammatically the cooling circuit of a plastics injection moulding circuit.

Referring to FIG. 1, a plastics injection moulding machine 1 has numerous hydraulically operated components and a hydraulic power pack 3 serves to operate these components. In use, the temperature of the hydraulic oil used in the power pack very often exceeds 50° C. Some of the heat present in the oil can be removed and used for other purposes. The oil is circulated by a pump 2 from an oil bath 7 through a plate or other high efficiency heat exchanger 5 to a power pack 3 from where it is returned to the oil bath. Inlet oil temperature sensor 4 and outlet oil temperature sensor 6 monitor the oil temperature, and are connected to differential temperature controller 10. A coil 9 is located in a duct 11 having a fan 13 at its lower end. A movable damper 15 is positionable in an aperture 17 close to the base of the duct. Water is circulated through a circuit including the heat exchanger 5 and the coil 9 by a pump 18. Regulating valve 12 in the water inlet line is connected to differential temperature controller 10. A temperature sensor 19 in the water circuit controls the damper 15. Water inlet temperature sensor 14 controls fan 13.

In use, oil having a temperature of at least 40° C. is circulated through the heat exchanger 5 and water is circulated through the heat exchanger and the coil 9. The quantity of water circulated through the heat exchanger is controlled by regulating valve 12 in response to differential temperature controller 10 so that the temperature of the oil leaving the heat exchanger is not more than 10° C. below the temperature of the oil entering the exchanger. The fan 13 is energized in response to water inlet temperature sensor 14 and the damper 15 controls the amount of air drawn into the duct 11 such that the temperature of the water in the coil 9 and, hence, that entering the heat exchanger is not less than 28° C. and not more than 40° C. Much of the heat obtained by the cooling water from the hydraulic oil in the heat exchanger is dissipated from the coil 9 as the air is blown over it by the fan 13. The heated air may pass to atmosphere from the duct 11 or it may be used in a space heater 21.

By ensuring that the temperature of the water in the heat exchanger is not less than 28° C., significant quantities of heat can be withdrawn from the hydraulic oil without lowering its temperature by more than 10° C.

Figure 2:
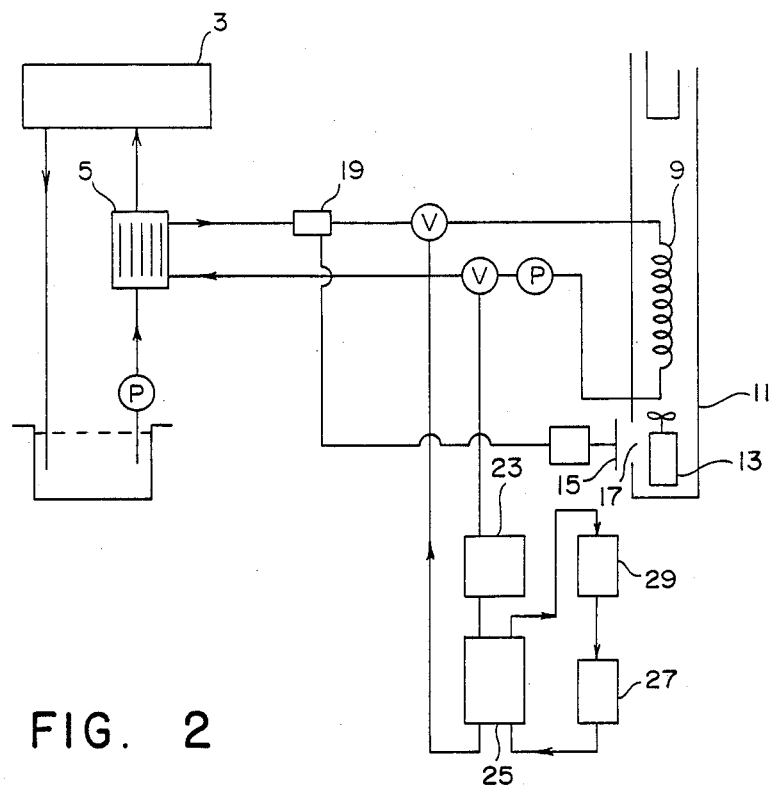
FIG. 2 shows diagrammatically an extended cooling circuit to that shown in FIG. 1.

The arrangement shown in FIG. 2 is an extension of that shown in FIG. 1 in that a portion of the water leaving the coil 9 is diverted through the condenser 23 of a chiller (not shown) operating on the refrigeration cycle and a water/water heat exchanger 25 before returning to the inlet to the coil 9 where it mixes with the water returning to the coil from the heat exchanger 5. Water passed through the condenser 23 takes in heat from the refrigerant to raise the water temperature to 46°-50° C. depending on ambient temperature. Secondary water in the heat exchanger 25 absorbs some of the heat present in the primary water and the secondary water is passed through a mould 27. If necessary, heat from an immersion heater or small boiler 29 is added to the secondary water to heat it sufficiently for it to be used for mould heating.

Figure 3:
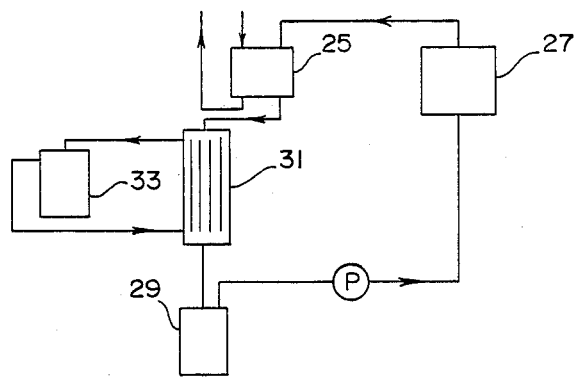
FIG. 3 shows diagrammatically a further modified cooling circuit to that shown in FIG. 2.

If additional heat is required, the water leaving the water exchanger 25 can be passed through a heat exchanger 31 hydraulically in series with the heater 29 and the mould 27, as shown in FIG. 3. Oil from an air compressor 33 is circulated through the heat exchanger 31 and the water cools the oil. The temperature of the water can be 70°-90° C. This water with even more heat provided by the heater/boiler 29 is used to heat the moulds after shut-downs or when processing high temperature polymers.

Warm air leaving the fan coil at between 34°-42° C. is used to space heat the surrounding environment, cooled water at 28°-46° C. from the fan coils being recirculated to the chiller condensor and hydraulic oil coolers.

If preferred, hydraulic oil from the moulding machines can be collected in a central storage tank, oil from this tank being circulated by centrifugal or other pump(s) through a single heat exchanger, cooled oil being returned to the moulding machines and warm water from the heat exchanger being mixed with warm water from the chiller condensor and passed through the coil 9.

If desired, some of the water from the air-cooled coil 9 can be used to cool the moulds.

I claim:

1. A method of reducing heat present in hydraulic oil in hydraulic circuitry of a machine in which oil at a temperature of at least 40° C. is circulated from the machine through a heat exchanger in heat exchange relation with water circulated therethrough, the temperature of the water entering the exchanger being at least 28° C.; and the quantity of water circulated through the exchanger is controlled such that the difference in temperature of the oil entering and leaving the exchanger is not more than 10° C.

2. A method as claimed in claim 1, in which the water is circulated through an air cooled coil, and the air cooling is controlled such that the temperature of the water leaving the coil is not less than 28° C.

3. A method as claimed in claim 1, in which water is circulated through an air cooled coil and a portion of the water circulated through the coil is used to cool a refrigeration system condenser.

4. A method as claimed in claim 3, in which said portion of the water is passed through the primary circuit of a water/water heat exchanger before being returned to the coil.

5. A method as claimed in claim 4, in which the water in the secondary circuit of the water/water heat exchanger is employed to cool the oil of an air compressor.

6. The combination of a machine having hydraulic circuitry containing hydraulic oil, a heat exchanger through which oil from said circuitry is caused to flow, means for circulating water through said heat exchanger in heat exchange relation with the oil and through an air-cooled coil, means for controlling the air cooling applied to the coil such that the temperature of the water entering the heat exchanger is not less than 28° C. and means for controlling the quantity of water circulated through the heat exchanger such that the difference in temperature of the oil entering and leaving the exchanger is not more than 10° C.

* * * * *